United States Patent
Iemoto et al.

(10) Patent No.: US 10,021,894 B2
(45) Date of Patent: Jul. 17, 2018

(54) METHOD FOR MANUFACTURING BAKED CHOCOLATE

(71) Applicant: MORINAGA & CO., LTD., Tokyo (JP)

(72) Inventors: Naoki Iemoto, Yokohama (JP); Yasuyoshi Kinta, Yokohama (JP)

(73) Assignee: MORINAGA & CO., LTD., Tokyo (JP)

( * ) Notice: Subject to any disclaimer, the term of this patent is extended or adjusted under 35 U.S.C. 154(b) by 1 day.

(21) Appl. No.: 15/305,136

(22) PCT Filed: Oct. 6, 2014

(86) PCT No.: PCT/JP2014/076675
§ 371 (c)(1),
(2) Date: Oct. 19, 2016

(87) PCT Pub. No.: WO2015/186271
PCT Pub. Date: Dec. 10, 2015

(65) Prior Publication Data
US 2017/0042177 A1  Feb. 16, 2017

(30) Foreign Application Priority Data
Jun. 4, 2014 (JP) .................. 2014-115371

(51) Int. Cl.
A23G 3/52 (2006.01)
A23G 1/00 (2006.01)
A23G 1/52 (2006.01)

(52) U.S. Cl.
CPC ............ *A23G 3/52* (2013.01); *A23G 1/0073* (2013.01); *A23G 1/52* (2013.01); *A23V 2002/00* (2013.01)

(58) Field of Classification Search
CPC ... A23G 1/36; A23G 1/54; A23G 3/52; A23V 2002/00
See application file for complete search history.

(56) References Cited

U.S. PATENT DOCUMENTS

| | | | |
|---|---|---|---|
| 7,666,460 B1 | 2/2010 | Keogh | |
| 2003/0003213 A1 | 1/2003 | Drantch et al. | |
| 2003/0031762 A1* | 2/2003 | Senba | A23G 1/04 426/103 |
| 2007/0098865 A1 | 5/2007 | Hosokawa | |
| 2011/0045158 A1* | 2/2011 | Perry | A21D 13/50 426/568 |
| 2014/0099412 A1* | 4/2014 | Ward | A23G 1/52 426/250 |
| 2015/0289535 A1* | 10/2015 | Kinta | A23G 1/00 426/631 |
| 2016/0088856 A1* | 3/2016 | Hirota | A23G 1/00 426/103 |

FOREIGN PATENT DOCUMENTS

| | | |
|---|---|---|
| CN | 1343101 A | 4/2002 |
| JP | 55-009174 B2 | 3/1980 |
| JP | 10-210934 A | 8/1998 |
| JP | 2000-270774 A | 10/2000 |
| JP | 2004-254638 A | 9/2004 |
| JP | 2004-254639 A | 9/2004 |
| JP | 2007-244235 A | 9/2007 |
| JP | 2008-206457 A | 9/2008 |
| JP | 2008-206458 A | 9/2008 |
| JP | 2010-207197 A | 9/2010 |
| JP | 2014-045706 A | 3/2014 |
| JP | 2014-087308 A | 5/2014 |
| WO | 2005/000027 A1 | 1/2005 |

OTHER PUBLICATIONS

International Search Report of PCT/JP2014/076675 dated Jan. 13, 2015.
First Office Action dated Jul. 18, 2017 from the Taiwanese Intellectual Property Office in counterpart Application No. 103134852.

* cited by examiner

*Primary Examiner* — Steven Leff
(74) *Attorney, Agent, or Firm* — Sughrue Mion, PLLC

(57) ABSTRACT

Provided is a method for manufacturing a baked chocolate by shaping a chocolate to a prescribed shape and baking, wherein the inherent softness of chocolate can be maintained in the interior of the baked chocolate obtained thereby, and sagging during baking and uneven baking can be prevented. During baking of the shaped chocolate in an oven, characterized in that an ambient temperature during a first half of baking is set to 170-350° C., an ambient temperature during a second half of baking is set to 150-330° C., and the temperature during the first half of baking is set to at least 20° C. higher than the temperature during the second half of baking. The baked chocolate is preferably aerated to a specific gravity of 0.3-1.1.

2 Claims, No Drawings

METHOD FOR MANUFACTURING BAKED CHOCOLATE

TECHNICAL FIELD

The present invention relates to a method for manufacturing baked chocolate.

BACKGROUND ART

Chocolate is a fat-based confection obtained by mixing cocoa mass, sugar, powdered milk, cocoa butter, emulsifiers, flavorings, and the like, refining (reducing the particle size) and conching (polishing) the mixture, which is then optionally tempered, and shaped. Chocolate has the characteristics of softening at about 28° C. or above, and then melting once reaching at least 33° C. Thus, problems such as loss of shape, stickiness resulting in products becoming stuck together, or sticking to the fingers when eaten may be encountered in instances when chocolate exposed to temperatures above the melting point of fatty ingredients such as cocoa butter.

Meanwhile, there are other chocolate products, such as baked chocolate obtained by shaping a chocolate to prescribed shape and baking the chocolate. Baked chocolate has a heat-resistant structure formed by denaturation of at least the surface layer by baking, and therefore does not have the problems of softening and melting of the chocolate as described above. Moreover, the chocolate is imparted with a baked flavor, giving at least the surface a cookie-like texture, resulting in a pleasant flavor and texture.

With regard to methods for manufacturing baked chocolate, Patent Document 1 cited below, for example, discloses a method for manufacturing a fat-based confection having excellent heat resistance, characterized by heating a fat-based confection, such as a chocolate, for several seconds to several tens of minutes at 80° C. or above to solidify the product. It is disclosed that this fat-based confection, even when left at temperatures at or above the melting point of the fat, does not become sticky or lose shape.

Document 2 cited below discloses the invention of a method for manufacturing a baked confection, characterized by incorporating air bubbles into a chocolate, which is then shaped, and baked to solidify. It is disclosed that, by incorporating air bubbles, the shape retention when baked is improved, and heat penetration is good, affording a baked texture that is light and pleasantly chewy.

Document 3 cited below discloses the invention of a method for manufacturing a baked confection, characterized in that a chocolate is prepared so as to contain less than 1.0% (w/w) of moisture, shaped to a prescribed shape, and baked. It is disclosed that the product does not become sticky or lose shape even when exposed to temperatures at or above the melting point of the fat ingredients, while the original smooth, soft structure of chocolate can be maintained in the interior.

Document 4 cited below discloses the invention of a method for manufacturing a baked chocolate confection obtained by shaping a normal-temperature hardenable chocolate to a prescribed shape and baking, characterized in that the baked chocolate confection contains a polyglycerin fatty acid ester in which the degree of polymerization of the glycerin is 2-3. It is disclosed that a chocolate confection that, even when baked, maintains in the interior the original smooth, soft texture of chocolate can be obtained thereby.

PRIOR ART DOCUMENTS

Patent Documents

[Patent Document 1] Japanese Examined Patent Application No. 55-9174
[Patent Document 2] Japanese Laid-Open Patent Application No. 10-210934
[Patent Document 3] Japanese Laid-Open Patent Application No. 2004-254639
[Patent Document 4] Japanese Laid-Open Patent Application

DISCLOSURE OF THE INVENTION

Problems to Be Solved by the Invention

A problem sometimes encountered when a chocolate is formed to a prescribed shape and baked is that the interior tends to lose the smooth, soft texture inherent to chocolate, and develop a dried-out texture. Other problems are sagging during baking or uneven baking. The methods disclosed in the aforementioned documents 1-4 are not techniques that can address all of these problems.

An object of the present invention is to provide a method for manufacturing a baked chocolate by shaping a chocolate to a prescribed shape and baking, whereby the inherent softness of chocolate can be maintained in the interior of the baked chocolate obtained thereby, and sagging during baking and uneven baking can be prevented.

Means to Solve the Problems

To achieve the stated object, the method for manufacturing a baked chocolate of the present invention is a method for manufacturing a baked chocolate by baking a shaped chocolate in an oven, characterized in that an ambient temperature during a first half of baking is set to 170-350° C., an ambient temperature during a second half of baking is set to 150-330° C., and the temperature during the first half of baking is set to at least 20° C. higher than the temperature during the second half of baking.

In the method for manufacturing a baked chocolate of the present invention, in preferred embodiment, the chocolate is aerated to a specific gravity of 0.3-1.1.

Advantageous Effects of the Invention

According to the present invention, during baking of shaped chocolate in an oven, the ambient temperature during the first half of baking is set to 170-350° C., the ambient temperature during the second half of baking is set to 150-330° C., and the temperature during the first half of baking is set to at least 20° C. higher than the temperature during the second half of baking, whereby the inherent softness of the chocolate can be maintained in the interior of the baked chocolate obtained thereby, and sagging during baking and uneven baking can be prevented.

BEST MODE FOR CARRYING OUT THE INVENTION

As the chocolate in the present invention, there can be employed, for example, a chocolate, a quasi-chocolate, a milk chocolate, a quasi milk chocolate, and other such commonly used chocolate. For example, the chocolate may be one prepared using chocolate ingredients such as cocoa mass and/or cocoa powder, sugars, powdered milk, emulsifiers, cocoa butter and/or cocoa butter substitutes, flavorings, and other ingredients commonly used in chocolate, in accordance with the usual methods of mixing the ingredients, refining, and then conching. However, "chocolate" herein is not limited to those defined by regulation and statute, and refers to all manner of fatty processed foods using cocoa mass, cocoa powder, cocoa butter, cocoa butter substitutes, and the like.

As sugars employed as chocolate ingredients, it is preferable to incorporate, for example, table sugar, and optionally other sugars such as trehalose, sugar alcohols, and the like. As powdered milk there can be employed, for example, whole milk powder, skim milk powder, or the like. The use of lecithin as an emulsifier is preferred.

As cocoa butter and/or cocoa butter substitutes, it is preferable to employ hard butters from coconut oil, palm oil, or palm kernel oil ingredients, trans type hard butters having elaidic acid as the constituent fatty acid, and other such non-tempering type fats, or cocoa butter and other such tempering type fats. However, since a tempering process in order to minimize bloom cannot be carried out subsequent to baking, the chocolate of the present invention is preferably a non-tempering type chocolate in which the occurrence of bloom is minimized by incorporating the aforementioned non-tempering type fats or the like. Also, because the chocolate will be shaped and baked, an ordinary temperature-hardenable chocolate is preferred.

Optionally, the chocolate may be aerated. By aerating the chocolate, the shape retention during baking is improved, and sagging during baking better prevented. Moreover, the heat penetration is improved, and therefore the texture after baking is light and pleasantly chewy. There are no particular limitations as to the aeration method; any of various methods, such as methods involving stirring at high speed so as to entrain air, methods involving stirring while forcibly blowing in air by a pump or the like, methods involving carrying out such stirring while heating, cooling, pressurizing, or depressurizing, can be employed. As an apparatus for doing so, for example, an aeration mixer, a Mondo mixer, an over mixer, or the like can be used.

In preferred embodiment, the chocolate is aerated to a specific gravity of 0.3-1.1, and more preferably 0.7-1.0. At a lower specific gravity, the texture tends to be lighter. Also, the baked chocolate tends to have good texture. The specific gravity can be measured by a method such as, for example, taking a level cup of 200 mL capacity of the chocolate in the fluid state prior to chilling, and measuring the mass thereof.

As auxiliary ingredients, the chocolate may contain minced nuts, puffed snacks, cookie bits, candy bits, chocolate chips, and the like. As minced nuts, it is preferable to use, e.g., minced nuts such as almonds, peanuts, cashew nuts, hazelnuts, macadamia nuts, walnuts, or the like, minced to the desired size. As puffed snacks, it is preferable to use, e.g., corn, wheat, rice, or other ingredients puffed by pressure and heat and extruded; or starchy ingredients, such as wheat flour, rice flour, or various other starches, combined with auxiliary ingredients, seasonings, water, and the like, thermally gelled, and puffed.

The chocolate can be shaped to a desired shape by known methods. There are no particular limitations as to the shaping method; for example, methods of shaping by placing into a mold (form), methods of extrusion to a desired shape from an extruder die and cutting, drop shaping methods in which the chocolate is dripped directly onto a conveyor or the like and solidifies, and the like are preferably employed.

There are no particular limitations as to the shape to which the chocolate is formed; in a preferred embodiment of the present invention, in order to maintain a soft, smooth feel of the interior after baking, the shaped product will have a minimum diameter of 0.5 cm or greater, and preferably 1.0-2.5 cm.

Further, in the preferred embodiment the present invention, prior to baking the shaped chocolate, the shaped product is placed for one hour or more in an environment having relative humidity of 50-70% and a temperature of 15-30° C., preferably a room humidity- and temperature-conditioned to the aforementioned ranges of humidity and temperature, and is then baked. In so doing, sagging during baking can be more effectively prevented.

Optionally, the chocolate may be shaped, and then at least a portion of the chocolate surface enrobed. As enrobing materials it is preferable to use, for example, one of cookie dough form or cake batter form, made by adding water to a mixture of ingredients selected from wheat flour, starch, eggs, sugar, salt, powdered milk, shortening, and the like; however, it would suffice to simply cover the product in a powdered mixture of wheat flour, starch, sugar, and the like. By enrobing the product with an enrobing material, shape retention during baking is further improved, and a thin coating of enrobing material is formed on the chocolate surface, giving an original appearance resembling the Japanese sweet kintsuba; also, the enrobing material makes it difficult for heat to penetrate to the interior. In so doing, the surface takes on a crispy, al dente texture through baking, while in the interior, a smooth, light texture that preserves the original soft structure of chocolate can be achieved.

In the present invention, shaped articles of the aforedescribed chocolate are baked in an oven. Baking is then carried out while setting an ambient temperature during a first half of baking to 170-350° C., setting an ambient temperature during a second half of baking to 150-330° C., and setting the temperature during the first half of baking to at least 20° C. higher than the temperature during the second half of baking. Baking may be carried out in a conveyor oven or the like, but there are no particular limitations as the baking apparatus. For example, the use of a tunnel type oven apparatus equipped with a heating oven having first and second heating zones in the direction of movement from the oven entrance side by shaped articles of the chocolate which have been placed on a conveyor, and configured such that the shaped articles of the chocolate placed on the conveyor are moved continuously or intermittently and passed through the oven, and during the first half and second half of baking, respectively, are thereby exposed to specific ambient temperatures corresponding to the first and second heating zones, is convenient in terms of operability.

Subsequent to baking, heat is removed by forcible cooling with a current of air or the like, to obtain baked chocolate.

EXAMPLES

The present invention is described more specifically below by citing examples, but the invention is not limited to these examples.

Examples 1-9, Comparative Examples 1-8

The ingredients in the proportions indicated in Table 1 were blended, mixed and refined by the usual methods, then conched to prepare chocolate. In the case of aeration, the chocolate was chilled to 25° C., placed in a pressurization mixer, stirred for 2 minutes at 2 atm, then returned to normal pressure, to prepare an aerated chocolate having specific gravity of 0.9.

TABLE 1

| Ingredient | Blended amount (mass parts) |
|---|---|
| Sugar | 31 |
| Trehalose | 10 |
| Cocoa powder | 15 |
| Whole powdered milk | 15 |
| Cocoa butter | 8 |
| Vegetable shortening | 21 |
| Lecithin | 0.5 |

The chocolates so obtained were packed into molds (inside diameter: 20 mm square, depth: 10 mm), chilled, and solidified, then removed from the molds and baked in a conveyor oven. The oven was equipped with a heating oven having first and second heating zones in the direction of movement of the shaped articles of chocolate placed on a conveyor from the oven entrance side, and designed such that the shaped articles of the chocolate placed on the conveyor are passed through the oven, whereby during the first half and second half of baking, respectively, the articles are exposed to specific ambient temperatures corresponding to the first and second heating zones. The speed of the conveyor was the same in each example, and depending on the baking temperature, the baking time was set to a baking time such that the finish of the chocolate surface was about the same. Baking conditions in the examples are given below.

Example 1: First half 170° C., second half 150° C., baking time 6.00 min
Example 2: First half 200° C., second half 150° C., baking time 5.50 min
Example 3: First half 350° C., second half 330° C., baking time 0.50 min
Example 4: First half 350° C., second half 300° C., baking time 0.60 min
Example 5: First half 260° C., second half 240° C., baking time 1.75 min
Example 6: First half 275° C., second half 225° C., baking time 1.50 min
Example 7: First half 300° C., second half 200° C., baking time 1.10 min
Example 8: First half 350° C., second half 150° C., baking time 0.80 min
Example 9: First half 275° C., second half 225° C., baking time 1.00 min
Comparative Example 1: First half 250° C., second half 250° C., baking time 1.85 min
Comparative Example 2: First half 225° C., second half 275° C., baking time 2.15 min
Comparative Example 3: First half 160° C., second half 140° C., baking time 6.50 min
Comparative Example 4: First half 180° C., second half 130° C., baking time 6.00 min
Comparative Example 5: First half 360° C., second half 340° C., baking time 0.40 min
Comparative Example 6: First half 370° C., second half 320° C., baking time 0.40 min
Comparative Example 7: First half 170° C., second half 160° C., baking time 5.75 min
Comparative Example 8: First half 340° C., second half 330° C., baking time 0.60 min These baked chocolates were evaluated by 10 panelists, ranking the softness of the texture in the interior into three grades. In the evaluations, a "⊙" symbol indicates an amply soft texture, a "○" symbol a soft texture, and an "×" symbol a hard texture, and represent averages for all panelists.

Additionally, the shapes of the baked chocolate after baking were compared to the shape prior to baking, and the extent of sagging during baking was evaluated. In the evaluations, a "⊙" symbol indicates that sagging during baking was greatly minimized, a "○" symbol that sagging during baking was minimized, and an "×" symbol that significant sagging during baking occurred, and represent averages for 10-20 samples.

Further, the extent of uneven baking of the baked chocolate was evaluated. In the evaluations, a "⊙" symbol indicates that uneven baking was greatly minimized, a "○" symbol indicates that uneven baking was minimized, and an "×" symbol indicates that significant uneven baking occurred, and represent averages for 10-20 samples.

Results are given in Table 2.

| | | Baking conditions | | | Evaluation | | |
|---|---|---|---|---|---|---|---|
| | | Oven temp (° C.) | | Baking time | Softness at center (3 | Sagging (3 | Unevenness (3 grade |
| | Aeration | 1st half | Second half | (min) | grade eval.) | grade eval.) | eval.) |
| Ex. 1 | no | 170 | 150 | 6.00 | ○ | ○ | ⊙ |
| Ex. 2 | no | 200 | 150 | 5.50 | ○ | ○ | ⊙ |
| Ex. 3 | no | 350 | 330 | 0.50 | ⊙ | ○ | ○ |
| Ex. 4 | no | 350 | 300 | 0.60 | ⊙ | ○ | ○ |
| Ex. 5 | no | 260 | 240 | 1.75 | ⊙ | ○ | ⊙ |
| Ex. 6 | no | 275 | 225 | 1.50 | ⊙ | ○ | ⊙ |
| Ex. 7 | no | 300 | 200 | 1.10 | ⊙ | ○ | ⊙ |
| Ex. 8 | no | 350 | 150 | 0.80 | ⊙ | ○ | ⊙ |
| Ex. 9 | yes | 275 | 225 | 1.00 | ⊙ | ⊙ | ⊙ |
| Cmp. Ex. 1 | no | 250 | 250 | 1.85 | ○ | X | ⊙ |
| Cmp. Ex. 2 | no | 225 | 275 | 2.15 | ○ | X | ⊙ |
| Cmp. Ex. 3 | no | 160 | 140 | 6.50 | X | ○ | ⊙ |
| Cmp. Ex. 4 | no | 180 | 130 | 6.00 | X | ○ | ⊙ |
| Cmp. Ex. 5 | no | 360 | 340 | 0.40 | ⊙ | ○ | X |
| Cmp. Ex. 6 | no | 370 | 320 | 0.40 | ⊙ | ○ | X |
| Cmp. Ex. 7 | no | 170 | 160 | 5.75 | ○ | X | ⊙ |
| Cmp. Ex. 8 | no | 340 | 330 | 0.60 | ⊙ | X | ○ |

From the results, the following was apparent.

(1) As may be seen from Examples 1-9, by baking with the ambient temperature during the first half of baking set to 170-350° C., the ambient temperature during the second half of baking set to 150-330° C., and the temperature during the first half of baking set to at least 20° C. higher than the temperature during the second half of baking, the inherent softness of the chocolate can be maintained in the interior of the baked chocolate obtained thereby, and sagging during baking and uneven baking can be prevented.

(2) As may be seen from Example 9, and particularly from a comparison thereof with Example 6, shape retention during baking is further improved by aerating the chocolate, and sagging during baking tends to be prevented to a greater extent.

(3) As may be seen from Comparative Example 1, when the ambient temperature during the first half of baking and the ambient temperature during the second half of baking are the same, the state of chocolate during baking is such that deformation is prone to occur, and sagging during baking tends to be unavoidable.

(4) As may be seen from Comparative Example 2, when the ambient temperature during the second half of baking is higher than the ambient temperature during the first half of baking, the state of chocolate during baking is such that deformation is prone to occur, and sagging during baking tends to be unavoidable.

(5) As may be seen from Comparative Examples 3 and 4, and particularly comparisons thereof to Examples 1 and 2 respectively, when the ambient temperature during baking is low and the baking time is prolonged, the interior of the baked chocolate tends to becomes dried out so that the inherent softness of the chocolate cannot be maintained.

(6) As may be seen from Comparative Examples 5 and 4, and particularly comparisons thereof to Examples 3 and 4 respectively, when the ambient temperature during baking is high and the baking time is not sufficiently long, the finished baked chocolate tends to develop burnt corners and edges, and uneven baking cannot be prevented.

(7) As may be seen from Comparative Example 7, and particularly from a comparison thereof with Example 1, even when the ambient temperature during the first half of baking and the ambient temperature during the second half of baking are ranges in which the results described previously in (1) are observed, if the ambient temperature during the second half of baking is not lower, by more than a given temperature, than the ambient temperature during the first half of baking, the state of chocolate during baking is such that deformation is prone to occur, and sagging during baking tends to be unavoidable.

(8) As may be seen from Comparative Example 8, and particularly from a comparison thereof with Example 3, even when the ambient temperature during the first half of baking and the ambient temperature during the second half of baking are ranges in which the results described previously in (1) are observed, if the ambient temperature during the first half of baking is not higher, by more than a given temperature, than the ambient temperature during the second half of baking, the state of chocolate during baking is such that deformation is prone to occur, and sagging during baking tends to be unavoidable.

The invention claimed is:

1. A method for manufacturing a baked chocolate comprising
    a step for shaping a chocolate in a predetermined form;
    a step of baking the shaped chocolate in an oven,
    wherein the baking is performed in such a manner that an ambient temperature during a first half of the baking is set to 170-350° C., an ambient temperature during a second half of the baking is set to 150-330° C., and the temperature during the first half of the baking is set to at least 20° C. higher than the temperature during the second half of the baking.

2. The method for manufacturing a baked chocolate according to claim 1, wherein, before the baking, the chocolate is aerated to a specific gravity of 0.3-1.1.

* * * * *